United States Patent [19]

Omoto et al.

[11] Patent Number: 5,058,777
[45] Date of Patent: Oct. 22, 1991

[54] AUTOMATIC METHOD AND APPARATUS FOR SCATTERING WOOD PIECES IN PRODUCTION OF A DECORATIVE BOARD

[75] Inventors: Kaneo Omoto; Hironao Nagasima; Tomohide Ogata; Ritsuo Iwata, all of Shizuoka, Japan

[73] Assignee: Yamaha Corporation, Shizuoka, Japan

[21] Appl. No.: 356,847

[22] Filed: May 25, 1989

[30] Foreign Application Priority Data

May 31, 1988 [JP] Japan ................ 63-133217
May 31, 1988 [JP] Japan ................ 63-133218

[51] Int. Cl.⁵ .................................... A45D 24/22
[52] U.S. Cl. ................................. 222/200; 221/211
[58] Field of Search ........... 222/200, 198, 199, 368, 222/55; 118/239, 244; 427/202; 221/211, 278; 198/478.1, 611, 612, 689.1

[56] References Cited

U.S. PATENT DOCUMENTS

| | | | |
|---|---|---|---|
| 2,100,315 | 11/1937 | Harper | 222/199 |
| 2,466,386 | 4/1949 | Curioni | 222/200 |
| 2,980,290 | 4/1961 | Fahrni | 222/199 |
| 3,013,693 | 12/1961 | Griner | 221/211 |
| 3,206,062 | 9/1965 | Rappaport | 221/211 |
| 3,545,968 | 12/1970 | Sato | 222/200 |
| 4,018,358 | 4/1977 | Johnson et al. | 221/211 |
| 4,650,093 | 3/1987 | Bosse | 221/278 |
| 4,741,460 | 5/1988 | Blain et al. | 222/200 |
| 4,843,579 | 6/1989 | Andrews et al. | 222/200 |

Primary Examiner—Robert P. Olszewski
Assistant Examiner—Kenneth Noland
Attorney, Agent, or Firm—Sachs & Sachs

[57] ABSTRACT

In production of a decorative board with overlaid wood pieces used for surface covering of various furniture, building materials and car interior decoration, wood pieces supplied from an overhead hopper by gravity are dispersed on a flat feeder by application of vibration and are transferred in a dispersed state onto base boards successively supplied by a transfer conveyor in a horizontal direction. Almost no need for manual operation raises production efficiency and dispersion by mechanical vibration assures high degree of uniformity of patterns on the products. Fully automatic processing enables reproduction of patterns with commerically acceptable fidelity.

6 Claims, 3 Drawing Sheets

AUTOMATIC METHOD AND APPARATUS FOR SCATTERING WOOD PIECES IN PRODUCTION OF A DECORATIVE BOARD

BACKGROUND OF THE INVENTION

The present invention relates to automatic method and apparatus for scattering wood pieces in production of a decorative board, and more particularly relates to improvement in production of a decorative board containing wood pieces such as flakes and/or chips on the top surface used for surface covering of various furniture, building materials and car interior decoration.

In most popular production of such a decorative board, a base board is impregnated with a resin mixture to form a prepregnated sheet, small wood chips are scattered on the top surface of the prepregnated sheet by operator's hands or by use of a sieve and the combination is subjected to a proper heat treatment.

Such a manner of dispersed deposition of the chips, however, is very low in productivity due to rather slow rate of scattering of the chips. In addition, manual scattering cannot always assure formation of a uniform pattern on the top surface of the decorative board. Further, presence of a human factor makes it difficult to reproduce the pattern with commercially acceptable fidelity.

SUMMARY OF THE INVENTION

It is the object of the present invention to produce a decorative board containing chips on the top surface with high grade of uniformity of the surface pattern, high process efficiency in production and commercially acceptable reproducibility of the surface pattern.

In accordance with the basic aspect of the present invention, wood pieces are supplied onto a feeder by gravity and are dispersed on the feeder by operation of a vibrator attached to the feeder. Concurrently, base boards are transported horizontally by a transfer conveyer and dispersed wood pieces are assigned onto the base board by operation of a conveyer belt arranged next to the feeder.

DESCRIPTION OF THE PREFERRED EMBODIMENTS

Figure 1:
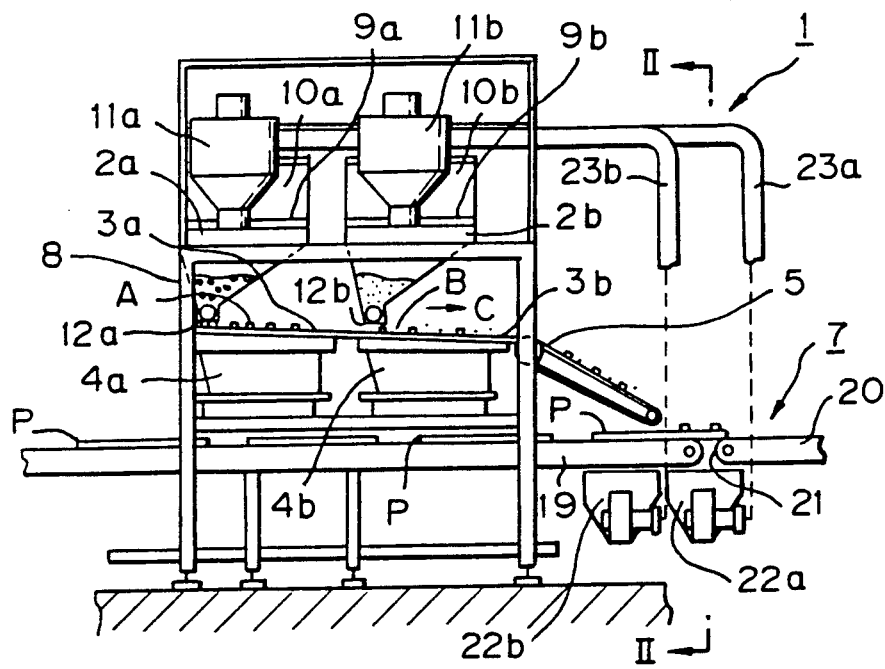
FIG. 1 is a side view of one embodiment of the apparatus in accordance with the present invention.
Figure 2:
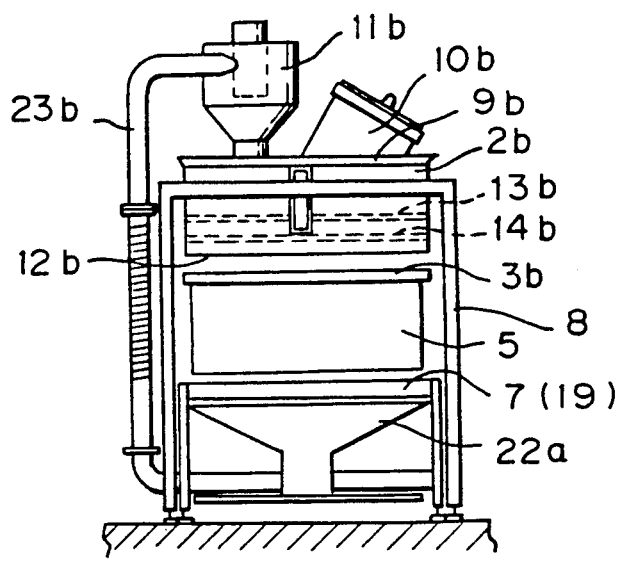
FIG. 2 is a view taken along a line II—II in FIG. 1.

One embodiment of the apparatus in accordance with the present invention is shown in FIGS. 1 and 2, in which the apparatus 1 is provided with a pair of juxtaposed hoppers 2a and 2b for supply of wood flakes A and wood chips B and a pair of feeders 4a and 4b arranged under the hoppers 2a and 2b respectively for supply of wood flakes A and wood chips B. The feeders 4a and 4b are provided with flat vibrators 3a and 3b for dispersion of the wood pieces wood flakes A and wood chips B supplied from the hoppers 2a and 2b. A conveyer belt 5 is arranged next to the downstream feeder 4b for transfer of wood pieces dispersed thereon. Under the feeders 4a and 4b and the conveyer belt 5 is arranged a transfer conveyer 7 for supply of prepregnated sheets P, i.e. base boards. The conveyer belt 5 is tilted downwards towards the lower run of the transfer conveyer 7 so that the flakes A with the chips B dispersed thereon and transferred by the conveyer belt 5 should be overlaid on each prepregnated sheet P transferred by the transfer conveyer 7 at the downstream end of the conveyer belt 5.

Figure 3:
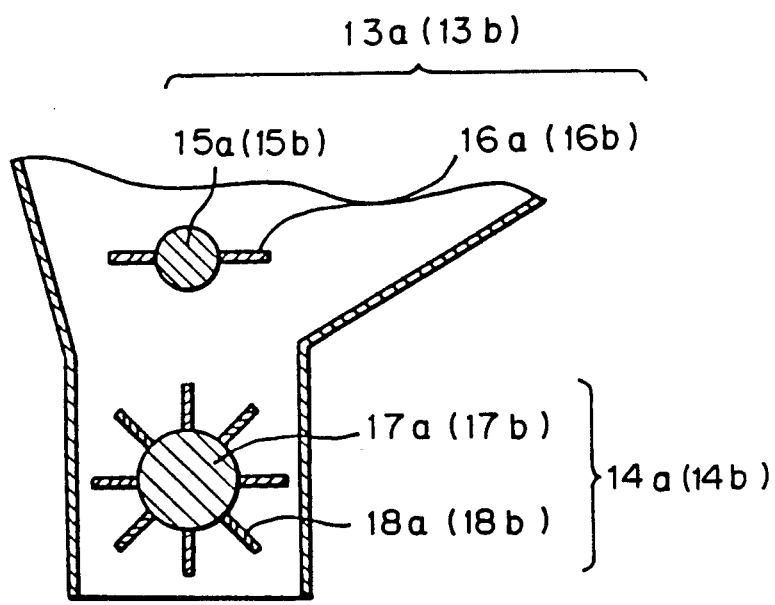
FIG. 3 is a side sectional view of a hopper used for the apparatus shown in FIG. 1.

In the above-described entire construction the hoppers 2a and 2b are secured atop of a framework 8 in a juxtaposed arrangement. Each hopper has a box shape provided with a downwardly converging bottom. As shown in FIG. 2, a supply chute 10a or 10b and a cyclone 11a or 11b is mounted to a top closure 9a or 9b of the hopper 2a or 2b. The supply chutes 10a and 10b are used for supply of the chips B. The hopper 2a or 2b is provided at its converging bottom with a discharge port 12a or 12b for the chips B and the flakes A. The cyclone 11a or 11b receives excess flakes A and excess chips B passed from a later described recollection hopper after separation from their carrier air for supply into the hopper 2a or 2b. In order to assure smooth, controlled discharge of wood pieces from the hopper 2a or 2b, the discharge port 12a or 12b is internally provided with a stirrer unit 13a or 13b and an adjuster unit 14a or 14b in a vertically spaced arrangement as best seen in FIG. 3. Though not shown in the drawings, the discharge port 12a or 12b is provided with a proper vibrator for smooth and uniform passage of the wood pieces.

The stirrer unit 13a or 13b includes a rotary shaft 15a or 15b, which is coupled to a known drive source such as a motor not shown, and vanes 16a or 16b radially affixed to the rotary shaft 15a or 15b. By rotation of the vanes 16a or 16b wood pieces falling down in the converging bottom of the hopper 2a or 2b are stirred actively in order to prevent a possible transfer jam.

The adjuster unit 14a or 14b is arranged below the stirrer unit 13a or 13b and includes a rotary shaft 17a or 17b, which is coupled to a known drive source such as a motor not shown, and vanes 18a or 18b radially affixed to the rotary shaft 17a or 17b. The above-described drive source is accompanied with a proper control unit so that wood pieces should be uniformly and intermittently discharged through the discharge port 12a or 12b upon controlled rotation of the vanes 18a or 18b.

The feeders 4a and 4b are mounted to the framework 8 under the discharge ports 12a and 12b of the hoppers 2a and 2b and provided atop with the vibrators 3a and 3b which oscillate, for example, in a vertical direction. The vibrators 3a and 3b receive the flakes A and the chips B falling down from the hoppers 2a and 2b via the discharge ports 12a and 12b and, by their vibration, disperse the uniformly over them to avoid their biased congregation and overlapping. these vibrators 3a and 3b are arranged in succession with a slight inclination in the direction of transfer, i.e. slope down from the side of the first hopper 2a to the side of the second hopper 2b in the case of the illustrated embodiment. The higher level end of each vibrator 3a or 3b is located right under the associated discharge port 12a or 12b of the associated hopper 2a or 2b. Inclination of the vibrators 3a and 3b are adjusted so that a continuous path of transfer should be formed by them. The flake A supplied onto the first vibrator 3a is transferred to the second vibrator 3b due to vibration and further transferred in a direction of transfer C with the chips B on the vibrator 3b. The drive source for the feeders 4a and 4b is provided with a proper known control unit for control of the degree of vibration of the vibrators 3a and 3b. Thus, biased congregation and overlapping of the wood pieces are well removed in reference to the size and weight of the wood pieces.

The conveyer belt 5 is arranged next to the second vibrator 3b in the direction of transfer and inclined downwards towards the transfer conveyer 7. This conveyer belt 5 receives the flakes A and the chips B in the dispersed disposition and transfers them to the prepregnated sheet P, i.e. the base board, without disturbing the dispersed disposition. The drive source for the conveyer belt 5 is accompanied with a proper known control unit for adjusted transfer of the flakes A and the chips B onto the prepregnated sheet P.

The transfer conveyer 7 includes the first and second conveyers 19 and 20 which are arranged in succession in the direction of transfer C for continuous transfer of a plurality of prepregnated sheets P. A gap 21 is left between the two conveyers 19 and 20 on the downstream side of the lower level end of the conveyer belt 5 and recollection hoppers 22a and 22b are arranged below the gap 21. When seen in the direction of transfer C, the size of the gap 21 is designed smaller than that of the prepregnated sheet 6. Excess flakes A and chips B supplied by the conveyer belt 5 fall down through the gap 21 into the recollection hoppers 22a and 22b. The recollection hoppers 22a and 22b are connected to a proper air supply source so that the excess flakes A and chips B should be pneumatically passed back to the cyclones 11a and 11b via transfer tubes 23a and 23b. The flakes A and the chips B are separated by a proper sieve so as to be accommodated in corresponding one of the recollection hoppers 22a and 22b.

For scattering of the flakes A and the chips B onto the prepregnated sheet P, i.e. the base board, on the above-described apparatus 1, prescribed amounts of the flakes A and the chips are supplied to the hoppers 2a and 2b from the associated cyclones 11a and 11b and the prepregnated sheets P are placed in position on the first conveyer 19 of the transfer conveyer 7. Next, the stirrer units 13a, 13b and the adjuster units 14a, 14b are driven for rotation so that the flakes A and the chips B should fall onto the vibrators 3a and 3b at an adjuster rate without the danger of transfer jam in the converging bottom of the hoppers 2a and 2b.

The flakes A and the chips B so deposited on the first vibrator 3a are uniformly dispersed thereon without biased congregation and overlapping due to vibration and gradually passed onto the second vibrator which furthers the uniformly dispersed disposition of the flakes A and the chips B which are again passed onto the conveyer belt 5. The conveyer belt 5 assigns the flakes A and the chips B onto each prepregnated sheet P carried by the transfer conveyer 7 whilst maintaining their uniformly dispersed disposition. The rate of assignment of the flakes A and the chips B can be freely changed depending on the product demand by adjusting the traveling speed of the conveyer belt. Excess flakes A and chips B are collected in the recollection hoppers 22a and 22b via the gap 21 between the two converyers 19 and 20 of the transfer conveyer 7 and passed back to the corresponding cyclones 11a and 11b via the transfer tulles 23a and 23b. Finally the prepregnated sheets P with the flakes A and the chips B are subjected to an aftertreatment such as heating.

According to the present invention, no manual operation is required after supply of the flakes A and the chips to the hoppers 2a and 2b, thereby making the production process almost fully automatic. Dispersion by operation of the vibrators 3a and 3b assures a uniform patterns on the surface of the products. By tactfully adjusted combination of operation rates of various mobile elements and size, mixing ratio and supply rates, reproduction of patterns can be carried out with commercially acceptable fidelity.

Figure 4:
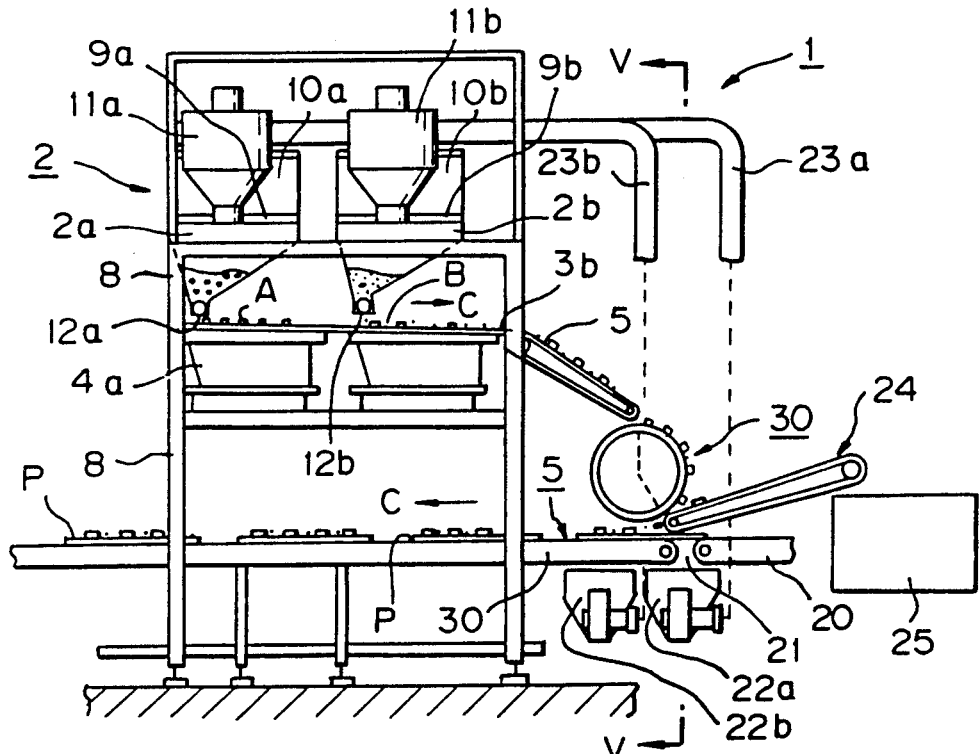
FIG. 4 is a side view of another embodiment of the apparatus in accordance with the present invention.

Another embodiment of the apparatus in accordance with the present invention is shown in FIG. 4, in while elements same as those in FIG. 1 are indicated with same reference numerals. In the case of the embodiment shown in FIG. 1, congregation and overlapping of the wood pieces are almost canceled by operation of the vibrators 3a and 3b. However, some wood pieces still remain overlapped each other on the surface of the conveyer belt 5 and such an overlapping tends to be carried over onto the prepregnated sheets P on the transfer conveyer 7. The outstanding embodiment is proposed in order to remove such overlapping before transfer of the wood pieces to the prepregnated sheets P.

In the arrangement shown in FIG. 4, the transfer conveyer 7 is more spaced downwards from the hoppers 2a and 2b that in FIG. 1 for addition of an overlap remover unit 30. More specifically, this remover unit 30 is arranged next to the lower level end of the conveyer belt 5 at a position slightly above the transfer conveyer 7. Further, a tilt conveyer belt 24 is arranged above the transfer conveyer 7 with its lower level end spacely facing the lower side of the remover unit 30 and its higher level end projecting over a collector box 25.

Figure 6:
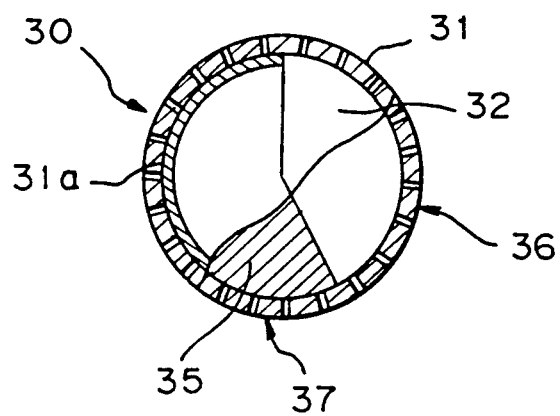
FIG. 6 is a side sectional view of an overlap remover unit used for the apparatus shown in FIG. 4.
Figure 5:
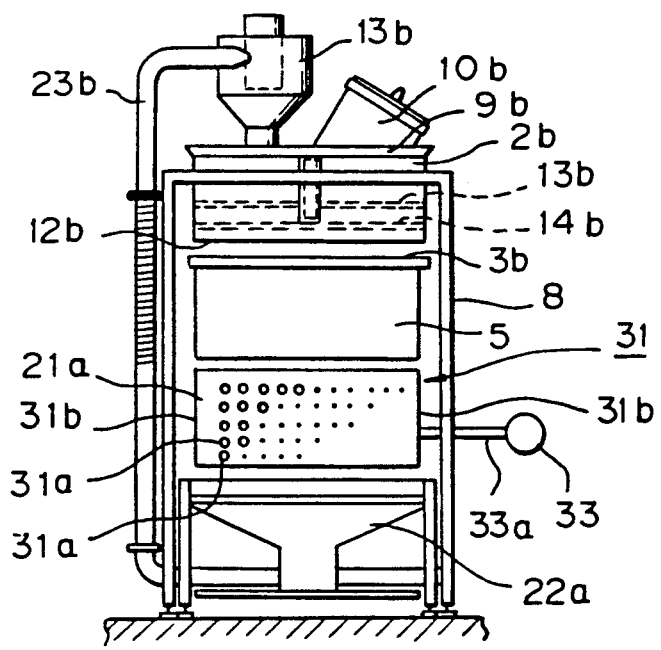
FIG. 5 is a view taken along a line V—V in FIG. 4.

The overlap remover unit 30 is shown in detail in FIGS. 5 and 6, in which the remover unit 30 includes a drum 31 provided with radial openings 31a and a pair of end closures 31b. The interior space 32 of the drum 31 is connected to a suction source 33 via a suction tube 33a.

One of the end closures 31b is fixed and the drum 31 is inserted over the fixed end closure 31b. The drum 31 is coupled to a proper drive such as a motor for free rotation about the fixed end closure 31b. Along the inner periphery of the drum 31 is arranged an arcuate cover plate 34 which spans about half of the periphery within the interior space 32. On both longitudinal ends the cover plate 34 is accompanied with fixed plates 35 for covering the end closures 31b of the drum 31. The suction tube 33a is coupled to the fixed end closure 31b at a position not covered by the fixed plate 35 in communication with the interior spare 32 of the drum 31. Thus, the drum 31 is provided with a remover surface 36 and a transfer surface 37. The remover surface 36 is not covered by the cover plate 34 and passes upper side wood pieces in overlap to the collector box 25 via the conveyer belt 24 whereas the transfer surface 37 is covered by the cover plate 34 and passes lower side wood pieces in overlap to the prepregnated sheets P on the transfer conveyer 7.

When the drum 31 is used as in the second embodiment, wood flakes A and chips B on the upper side of the mass supplied are not sucked directly onto the surface of the drum 31 and, as the drum 31 rotates, fall onto the conveyer belt 24. As a consequence, superimposed deposit of the flakes A and the chips B on the prepregnated sheet can be almost perfectly prevented.

When the openings 31a in the drum 31 are distributed in accordance with a patter to be formed on the prepregnated sheet P by the flakes A and the chips B, the flakes A and the chips B can be sucked onto the surface of the drum 31 in such a pattern. Thus, the flakes A and the chips B can be scattered onto the prepregnated sheet in any desired patterns.

We claim:

1. Automatic apparatus for scattering wood pieces in production of a decorative board comprising
    at least one hopper for supplying wood pieces,
    at least one vibrating feeder arranged below said hopper for dispersing said wood pieces supplied from said hopper,
    a transfer conveyer arranged below said feeder for successively transporting base boards,
    an inclined conveyer belt arranged next to said feeder with its lower level end facing said transfer conveyer,
    an overlap remover unit disposed below and between the end of said inclined conveyer belt and said transfer conveyer, said remover unit including a porous drum whose interior space is connected to a suction source, said inclined conveyer belt having one end thereof disposed beneath said overlap remover unit, and
    means for collecting wood pieces fed from said porous drum before transfer to said base boards,
    whereby said wood pieces from said feeder are transferred in a dispersed state onto said base boards.

2. Automatic apparatus as claimed in claim 1 in which the top face of said feeder is inclined downwardly towards said conveyer belt.

3. Automatic apparatus as claimed in claim 1 in which said hopper is internally provided with a stirrer unit for preventing supply jam of said wood pieces.

4. Automatic apparatus as claimed in claim 1 in which said hopper is internally provided with an adjuster unit for controlling supply rate of said wood pieces.

5. Automatic apparatus as claimed in claim 1 in which said transfer conveyer includes a pair of juxtaposed conveyers having a gap between them, which is located on the down stream side of said lower level end of said conveyer belt, and
    at least one recollection hopper is arranged below said gap for accommodation of excess wood pieces.

6. Automatic apparatus for scattering wood pieces in production of a decorative board comprising
    at least one hopper for supplying wood pieces,
    at least one vibrating feeder arranged below said hopper provided with a top surface inclined downwardly from said hopper for dispersing said wood pieces supplied from said hopper,
    a transfer conveyer arranged below said feeder for successively transporting base boards and including a pair of successive conveyers which have a small gap between them,
    an inclined conveyer belt disposed between said feeder and said transfer conveyer with its lower end being located on the upstream side of said gap, and
    an overlap remover unit disposed between said vibrating feeder and the lower end of said inclined conveyer belt for transferring said wood pieces from said overlap remover unit to a point upstream of the lower end of said inclined conveyer belt
    whereby said wood pieces from said feeder are transferred in a dispersed state onto said base boards and excess wood pieces are removed from said transfer conveyer by said gap.

* * * * *